(12) United States Patent
Jaker et al.

(10) Patent No.: US 11,104,041 B2
(45) Date of Patent: Aug. 31, 2021

(54) CONSUMABLE FEEDSTOCK FOR 3D PRINTING AND METHOD OF USE

(71) Applicant: Stratasys, Inc., Eden Prairie, MN (US)

(72) Inventors: Vittorio L. Jaker, Chanhassen, MN (US); Brandon Cernohous, Hudson, WI (US)

(73) Assignee: Stratasys, Inc., Eden Prairie, MN (US)

( * ) Notice: Subject to any disclaimer, the term of this patent is extended or adjusted under 35 U.S.C. 154(b) by 490 days.

(21) Appl. No.: 15/926,689

(22) Filed: Mar. 20, 2018

(65) Prior Publication Data

US 2018/0264688 A1    Sep. 20, 2018

Related U.S. Application Data

(60) Provisional application No. 62/473,637, filed on Mar. 20, 2017.

(51) Int. Cl.
| | |
|---|---|
| *B29C 33/38* | (2006.01) |
| *B29C 64/118* | (2017.01) |
| *B33Y 80/00* | (2015.01) |
| *C08L 81/06* | (2006.01) |
| *B33Y 30/00* | (2015.01) |
| *B29L 31/00* | (2006.01) |
| *B29K 307/04* | (2006.01) |
| *B29K 81/00* | (2006.01) |
| *B29K 105/12* | (2006.01) |
| *B29C 70/46* | (2006.01) |

(Continued)

(52) U.S. Cl.
CPC ........ *B29C 33/3842* (2013.01); *B29C 64/118* (2017.08); *B33Y 10/00* (2014.12); *B33Y 30/00* (2014.12); *B33Y 70/00* (2014.12); *B33Y 80/00* (2014.12); *C08L 81/06* (2013.01); *B29C 70/46* (2013.01); *B29K 2081/04* (2013.01); *B29K 2081/06* (2013.01); *B29K 2105/12* (2013.01); *B29K 2307/04* (2013.01); *B29K 2881/04* (2013.01); *B29K 2881/06* (2013.01); *B29K 2995/0012* (2013.01); *B29L 2031/757* (2013.01); *G03G 15/224* (2013.01)

(58) Field of Classification Search
CPC ...... B29C 33/3842; C08L 81/06; B33Y 30/00
See application file for complete search history.

(56) References Cited

U.S. PATENT DOCUMENTS

| | | | |
|---|---|---|---|
| 4,021,596 | A | 5/1977 | Bailey |
| 4,703,081 | A | 10/1987 | Blackwell et al. |

(Continued)

FOREIGN PATENT DOCUMENTS

EP    0382409 A2    8/1990

*Primary Examiner* — Michael M. Robinson
(74) *Attorney, Agent, or Firm* — Peter J. Ims; Westman, Champlin & Koehler, P.A.

(57) ABSTRACT

A consumable material configured for use in an additive manufacturing system includes a polymeric matrix having polyethersulfone (PES) in a range of between about 30 wt % and about 85 wt % of the polymeric matrix and polyphenylene sulfide (PPS) in a range between about 15 wt % and about 70 wt % of the polymeric matrix, wherein the polymeric matrix is in a media form suitable for processing in the additive manufacturing system and having a Tg that is about 190° C. or greater and a coefficient of thermal expansion of less than about 30 μm/(m·° C.). The consumable material is suitable for use in 3D printing of composite mold tools.

18 Claims, 11 Drawing Sheets

(51) Int. Cl.
   *B33Y 10/00*    (2015.01)
   *B33Y 70/00*    (2020.01)
   G03G 15/22      (2006.01)

(56) References Cited

U.S. PATENT DOCUMENTS

| | | |
|---|---|---|
| 4,863,538 A | 9/1989 | Deckard |
| 5,132,143 A | 7/1992 | Deckard |
| 5,204,055 A | 4/1993 | Sachs et al. |
| 8,221,858 B2 | 7/2012 | Mannella et al. |
| 8,459,280 B2 | 6/2013 | Swanson et al. |
| 8,488,994 B2 | 7/2013 | Hanson et al. |
| 8,718,522 B2 | 5/2014 | Chillscyzn et al. |
| 8,879,957 B2 | 11/2014 | Hanson et al. |
| 8,955,558 B2 | 2/2015 | Bosveld et al. |
| 9,023,566 B2 | 5/2015 | Martin |
| 9,523,934 B2 | 12/2016 | Orrock et al. |
| 2005/0266930 A1* | 12/2005 | Byrne ............... A63B 53/0466 473/324 |
| 2015/0028523 A1* | 1/2015 | Jaker ........................ C08K 3/40 264/401 |
| 2015/0251353 A1* | 9/2015 | Rodgers ............... B29C 64/153 264/406 |
| 2016/0039194 A1 | 2/2016 | Cable |
| 2017/0210079 A1 | 7/2017 | Deshmukh et al. |
| 2018/0036952 A1* | 2/2018 | Hocker ................ B29C 64/106 |

\* cited by examiner

CONSUMABLE FEEDSTOCK FOR 3D PRINTING AND METHOD OF USE

CROSS REFERENCE TO RELATED APPLICATION(S)

The present application claims the benefit of U.S. Provisional Patent Application Ser. No. 62/473,637 entitled HIGH TEMPERATURE CHEMICAL RESISTANT MATERIAL AND METHOD OF USE that was filed on Mar. 20, 2017, the contents of which are incorporated by reference in its entirety.

BACKGROUND

The present disclosure relates to a feedstock for use in additive manufacturing systems for printing three-dimensional (3D) parts having high heat resistance, low coefficient of thermal expansion and enhanced resistance to degradation due to exposure to chemicals. In particular, the present disclosure relates a feedstock having a blend of polyethersulfone (PES) and polyphenylene sulfide (PPS), methods of printing parts using PES and PES/PPS blended material utilizing additive manufacturing, and methods of manufacturing parts using the printed parts.

Additive manufacturing, also called 3D printing, is generally a process in which a three-dimensional (3D) object is built by adding material to form a 3D part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support structure adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in at least two degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing. Therefore, part strength and consistency may be improved, and build time may be shortened using multi-axis printing.

In an electrophotographic 3D printing process, slices of the digital representation of the 3D part and its support structure are printed or developed using an electrophotographic engine. The electrophotographic engine generally operates in accordance with 2D electrophotographic printing processes, but with a polymeric toner powder. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

SUMMARY

An aspect of the present disclosure includes a material for use in an additive manufacturing system. A consumable material includes a polymeric matrix having polyetherersulfone (PES) in a range of between about 30 wt % and about 85 wt % of the polymeric matrix and polyphenylene sulfide (PPS) in a range between about 15 wt % and about 70 wt % of the polymeric matrix, wherein the polymeric matrix is in a media form suitable processing in the additive manufacturing system and having a Tg that is about 190.degree. C. or greater and a coefficient of thermal expansion is less than about 23 μm/(m ° C.) to about 29 23 μm/(m ° C.).

Another aspect of the present disclosure relates to a material having a polymer matrix of polyethersulfone (PES) and polyphenylene sulfide (PPS) having a Tg that is about 190° C. or greater and a coefficient of thermal expansion is less than about 30 μm/(m·° C.).

Another aspect of the present disclosure includes a method for printing a three-dimensional part with an additive manufacturing system. The method includes providing a material comprising a polymeric matrix comprising polyethersulfone (PES) and polyphenylene sulfide (PPS) in a media form suitable for the additive manufacturing system. The material is processed in the additive manufacturing system to print the three-dimensional part in a layer-wise manner.

Another aspect of the present disclosure includes a method for forming a three-dimensional part with an additive manufacturing system. The method includes providing a feedstock comprising a polymeric material load with fillers wherein the fillers comprise between about 5 vol. % and about 40 vol. % of the feedstock, wherein the feedstock has a Tg that is about 190° C. or greater, wherein the feedstock has a coefficient of thermal expansion that is less than about 30 μm/(m·° C.), in a media form suitable for the additive manufacturing system. The method further includes processing the material in the additive manufacturing system to print a composite mold tool.

Another aspect of the present disclosure relates to a method of producing a part using a layup manufacturing technique. The method includes providing a printed mold tool formed from a filled polymeric matrix having a Tg that is about 190° C. or greater and has a coefficient of thermal expansion that is less than about 30 μm/(m·° C.). A solid material and uncured resin are placed on the mold tool. The mold tool, the material and the uncured resin are subjected to process conditions sufficient to cure the resin to form the part. The part is removed from the mold tool and residue on the mold tool is removed with a solvent. The process is repeated to manufacture multiple parts where the residue is removed with the solvent wherein the material of the mold tool withstands the process conditions and repeated exposure to solvent utilized in the layup manufacturing technique.

Definitions

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The terms "preferred" and "preferably", "example" and "exemplary" refer to embodiments that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyethersulfone (PES) and/or polyphenylene sulfide (PPS) is interpreted to include one or more polymer molecules of the PES and/or PPS, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one PES or PPS", "one or more PES or PPS", and "PES(s) or PPS(s)" may be used interchangeably and have the same meaning.

The terms "about" and "substantially" are used herein with respect to measurable values and ranges due to expected variations known to those skilled in the art (e.g., limitations and variability in measurements).

The term "providing", such as for "providing a support material", when recited in the claims, is not intended to require any particular delivery or receipt of the provided part. Rather, the term "providing" is merely used to recite parts that will be referred to in subsequent elements of the claim(s), for purposes of clarity and ease of readability.

Unless otherwise specified, temperatures referred to herein are based on atmospheric pressure (i.e. one atmosphere).

"Heat deflection temperature" or "heat distortion temperature" (HDT) is the temperature at which a polymer sample deforms under a 1.8 MPa load and is as determined by the test procedure outlined in ASTM D648.

All patents, publications or other documents mentioned herein are incorporated by reference.

DETAILED DESCRIPTION

Figure 1:
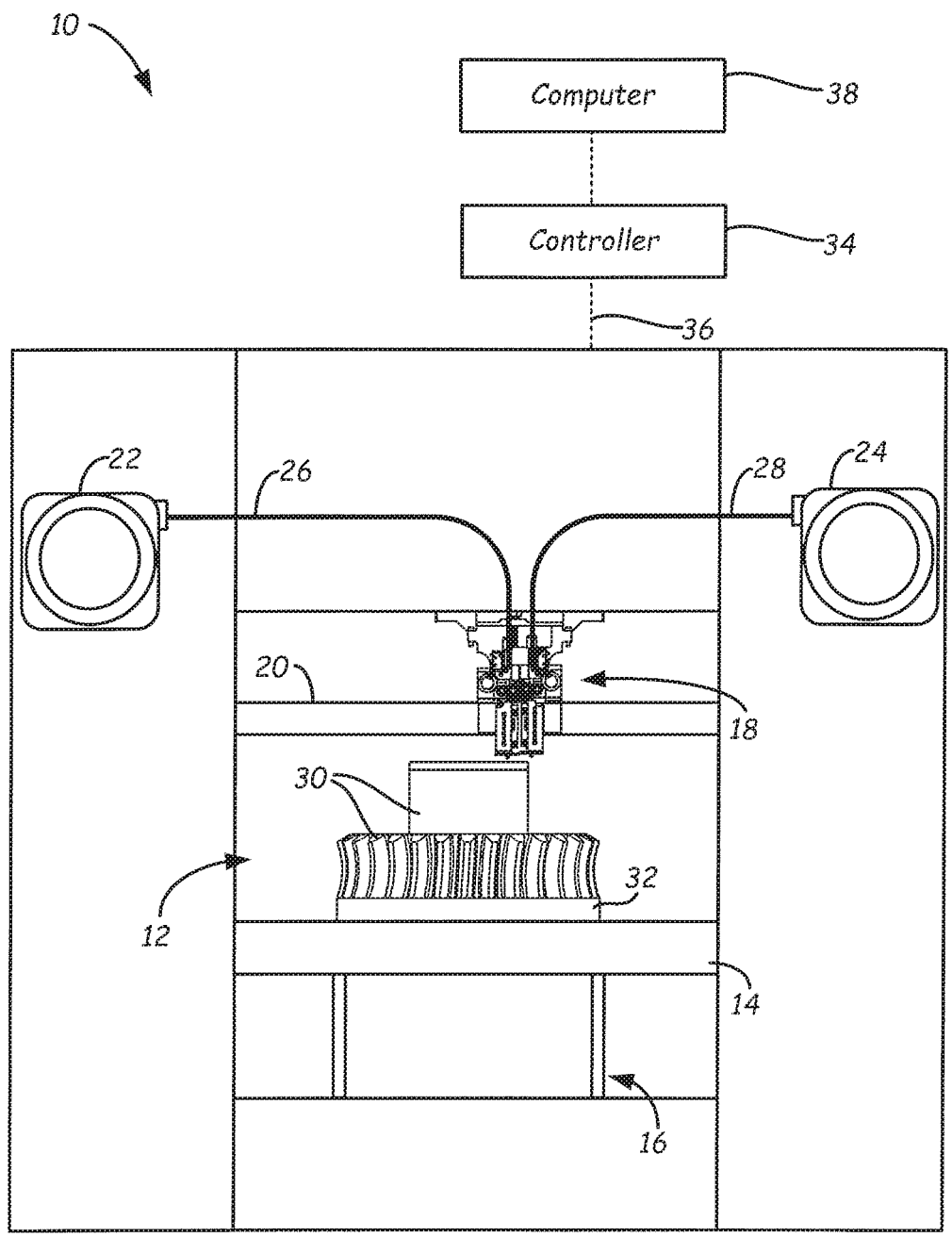
FIG. 1 is a front view of an extrusion-based additive manufacturing system configured to print printed parts and support structures, where the support structures are printed from a support material of the present disclosure.

The present disclosure relates to a feedstock material that can be utilized in an additive manufacturing system, commonly referred to as a 3D printer. The feedstock includes a blend of polyethersulfone (PES) and polyphenylene sulfide (PPS) and optionally other materials. The PES/PPS feedstock combines the heat and creep resistance properties of the amorphous PES with the chemical resistance of the semi-crystalline PPS, where the PPS can be fully crystallized. The feedstock has material properties between those of PES by itself or PPS by itself, but with enhanced resistance to chemicals due to the crystalline properties of the PPS, which are useful in improving mold-making properties of the material.

The feedstock having the PES/PPS blend exhibits high heat resistance, low coefficient of thermal expansion and enhanced resistance to degradation due to exposure to chemicals. These materials are well suited for applications such as tooling and parts for subsequent composite layup manufacturing, because of their low coefficient of thermal expansion, and high temperature tolerance applications. Nonlimiting uses of these materials include the building of molds using high-performance composite resins that are utilized to create composite/epoxy overlay parts and subject them to the subsequent high temperature cure-cycle requirements for epoxy curing.

Traditionally, the aerospace industry uses metal molds (aluminum, tool steel or Invar, for example) for these applications, because they have a low coefficient of thermal expansion during the cure process. The metal molds are re-useable and can endure harsh chemical conditions without failure or cracking. However, these molds are very expensive to produce, and have a long lead time when shape changes are needed.

The PES/PPS blended feedstock for this disclosure have a glass transition temperature ($T_g$) of about 220° C. (appropriate for the FDM extrusion process) which makes the blend stable, while also enabling the FDM mold part to endure process conditions ranging from about 175° C. (350° F.) to about 204° C. (400° F.), which is a typical temperature range for epoxy curing the epoxy used in the composite layup manufacturing process, for the manufacturing of composite parts.

Further, the coefficient of thermal expansion (CTE) of the PES/PPS blend material is substantially consistent and less than 30 μm/(m·° C.) from about room temperature (25° C.) to about 200° C. The chemical resistance of the PES/PPS blend also makes the material well suited in composite layup manufacturing, such as but not limited to, the manufacturing of carbon fiber parts. In some instances, fillers can be added to allow a higher weight percent of PPS to be added to the PES/PPS blend to increase the chemical resistance of the polymer matrix, while maintaining the $T_g$ at a sufficiently high temperature for part strength and/or subsequent processing durability. However, the PES/PPS material can be utilized for any suitable application, and is not limited to producing a tool or tooling inserts. By adding fillers such as graphite or carbon fiber, the CTE can be lowered in both the XY and XZ directions of a part build.

The material of the present disclosure may be configured for use with several different additive manufacturing techniques, such as, but not limited to extrusion-based additive manufacturing systems, high-speed sintering systems, selective laser sintering systems, electrophotographic based systems and the like. Further, the use of the disclosed material is not limited to additive manufacturing.

As shown in FIG. 1, system 10 is an example of an extrusion-based additive manufacturing system for printing or otherwise building 3D parts and support structures using a layer-based, additive manufacturing technique, where the support structures may be printed from the support material of the present disclosure. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner Exemplary techniques for locally heating a deposition region include heating platen 14 and/or utilizing directing heated air towards platen 14 and/or the printed parts/support structures being printed. The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or liner on which the printed parts and support structures are printed. In the shown example, print head 18 is a dual-tip extrusion head configured to receive consumable filaments from consumable assemblies 22 and 24 (e.g., via guide tubes 26 and 28) for printing printed part 30 and support structure 32 on platen 14. Consumable assembly 22 may contain a supply of a PES/PPS model material for printing printed part 30 by melting and extruding the molten material in a series of roads to form layers of the 3D part. Consumable assembly 24 may contain a supply of a support material, having similar material properties as the PES/PPS material, for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Print head 18 thermally melts the successive portions of the received PES/PPS material such that it becomes molten. The molten PES/PPS material may then be extruded and deposited from print head 18 as a series of roads onto platen 14 for printing part 30 in a layer-by-layer manner in coordination with the printing of support structure 32.

After the print operation is complete, the resulting printed part 30 and support structure 32 may be removed from chamber 12. Support structure 32 may then be sacrificially removed from printed part 30. Examples of suitable removal units for dissolving or disintegrating support structure 32 include those disclosed in Swanson et al., U.S. Pat. No. 8,459,280.

In addition to the above-discussed extrusion-based additive manufacturing system, which preferably provides the PES/PPS part material and the support material in filament form, the support material may alternatively be provided to an extrusion-based additive manufacturing system in powder form for use in a screw pump extruder, such as disclosed in Bosveld et al., U.S. Pat. No. 8,955,558. In this embodiment, the PES/PPS part material is preferably pelletized or otherwise micronized and/or classified to attain desired particle sizes for use in the screw-pump extruder. For example, a suitable average particle size for use of the PES/PPS part material powder in a screw extruder ranges from about 15 micrometers to about 125 micrometers, and in some embodiments from about 20 micrometers to about 50 micrometers, The PES/PPS part material may also be utilized in a powder form in an electrophotography-based additive manufacturing system. The compositions of the present disclosure may be provided in triboelectrically charged powder form for use in electrophotography-based additive manufacturing systems. Electrophotography-based ("EP-based") additive manufacturing systems are disclosed, for example, in Hanson et al., U.S. Pat. Nos. 8,879,957 and 8,488,994, and Chillscyzn et al., U.S. Pat. No. 8,718,522. As discussed in these references, the electrophotography-based additive manufacturing systems operate with layer transfusion assemblies that transfuse successively-developed layers of imaged powder materials from a transfer medium onto an intermediate part surface to thereby print 3D parts. Powder materials for use in EP-based additive manufacturing systems may have a particle size distribution ranging from about 5 micrometers to about 50 micrometers, and include a charge control agent. The addition of a charge control agent to polymer powders for EP-based systems is disclosed in Orrock et al., U.S. Pat. No. 9,523,934, and in Martin, U.S. Pat. No. 9,023,566, the disclosure of which is incorporated by reference to the extent that it does not conflict with the present disclosure.

Moreover, the PES/PPS part material may be provided in powder form for use in other powder-based additive manufacturing systems, such as selective laser sintering systems (e.g., systems disclosed in Deckard, U.S. Pat. Nos. 4,863,538 and 5,132,143), high speed sintering systems, powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the PES/PPS part material is also preferably pelletized or otherwise micronized and/or classified to attain desired powder particle sizes for use in the particular system.

Whether the PES/PPS part material is a filament or powder, the PES/PPS part material when melted and bonded upon solidification produces 3D parts that have high heat resistance, low coefficients of thermal expansion and enhanced resistance to degradation due to exposure to chemicals. The PES/PPS part materials are well suited for use as a tool or a tooling insert for composite layup manufacturing, such as but not limited to, the manufacturing of carbon fiber parts or other composite part which can be loaded with up to about 70% of materials such as, but not limited, carbon fiber and/or glass fiber. The tool and/or tooling insert printed from the PES/PPS part material is capable of withstanding the heat and pressure required to cure filled epoxy resin parts that are commonly produced for use in the aerospace industry, while still providing low mold expansion (CTE) during the epoxy curing step of a composite tooling fabrication process.

Most FDM materials available do not have a low enough CTE for use in mold making—that would be comparable to that of when using a metal mold, such as an Aluminum (CTE 26 μm/(m·° C.)). Most commodity plastics have a CTE of 100 μm/(m·° C.), which provides far too much expansion of composite molds during a heat curing step, thus deforming the composite layup in the mold—up to 6 mm of size expansion, depending on size. These common materials are also only temperature stable up to 100° C., so they would be destroyed during subsequent usage. Few plastics, like PEI, PSU, PES and PPSU have a CTE less than 60 μm/(m·° C.), and yet, most of them do not have a high enough $T_g$ to endure the 175-200° C. curing step. Using the disclosed blend of PES and PPS allows both the CTE and $T_g$ requirements to be met.

Additionally, since PPS is a semi-crystalline polymer material, it can provide chemical exposure robustness to an FDM part. However, if too much PPS is used, the FDM filament, as well as the part can become brittle when handled. Formulating a composite resin with PES with a semi-crystalline polymer, such as PPS, parts printed with the PES/PPS part material are capable of withstanding direct contact with solvents, such as ketones and aromatic hydrocarbons which commonly cause environmental stress cracking (ESC) in amorphous polymers during exposure. Ketones, such as methyl-ethyl ketone (MEK) and acetone are common solvents used for cleaning molds, and thinning epoxy resin formulations used during composite layup manufacturing operations.

Most common materials used for 3D printing are amorphous thermoplastics are selected because of their thermally and mechanically acceptable polymeric properties. However, amorphous thermoplastics have a relatively low resistance to cracking and loss of mechanical integrity when exposed to solvents. Materials such as PEI, PES and PSU all have relatively poor chemical resistance, especially toward common mold cleaners and degreasers. Three dimensional molds built to use as composite molds for carbon fiber composites need to be able to endure high curing temperatures of up to 200° C. With the disclosed formulations, parts produced from the PES/PPS material, such as tools and tooling inserts, can endure high temperature, provide low CTE and robustness to chemical exposure, and can also be used multiple times to manufacture parts using layup manufacturing without cracking, breakage or failure of the tool or tooling insert caused by the repeat usage of solvent and/or process conditions required when applying the epoxy/solvent solutions and overlayments, or when curing, removing or cleaning a finished composite part.

The disclosed formulations use PES to provide high temperature durability and low thermal expansion, while the addition of PPS brings an improved level of chemical resistance. The disclosed formulations provide high strength, lack of stress cracking or brittleness, and appropriate extrudability in a 3D printing application (appropriate viscosity and $T_g$). In some embodiments, the material includes between about 30% by weight and about 85% by weight PES and between about 15% by weight and about 70% by weight PPS based upon the total weight of the polymeric materials. In other embodiments, the polymeric material can include between about 30% by weight and about 70% by weight PES and between about 30% by weight and about 70% by weight PPS based upon the total weight of the polymeric materials. In other embodiments, the polymeric material can include between about 35% by weight and about 65% by weight PES and between about 35% by weight and about 65% by weight PPS based upon the total weight of the polymeric materials. In other embodiments, the polymeric material can include between about 40% by weight and about 60% by weight PES and between about 40% by weight and about 60% by weight PPS based upon the total weight of the polymeric materials. In other embodiments, the polymeric materials can include between about 40% by weight and about 50% by weight PES and between about 50% by weight and about 60% by weight PPS.

Any suitable source of PES and PPS can be utilized. Exemplary, nonlimiting sources of PES include PES sold under the VERADEL® 3600 trade designation by Solvay Societe Anonyme having a corporate headquarter located in Bruxelles, Belgium and ULTRASON E1010 manufactured by BASF SE headquartered in Ludwigshafen, Germany. Exemplary, nonlimiting sources of PPS includes PPS sold under the FORTRON® trade designation by Celanese Corporation having a corporate headquarter located in Irving, Tex. and RYTON® trade designation by Solvay Societe Anonyme having a corporate headquarter located in Bruxelles, Belgium. However, other sources of the PES and PPS are within the scope of the present disclosure.

In some embodiments, the polymer matrix can include impact modifiers that lessen the brittle characteristics of the PPS in the polymer matrix. As the weight percent of the PPS increases relative to the amount of PES, the amount of impact modifier can be increased to counteract the brittleness of the PPS in the PES/PPS polymer matrix.

In some embodiments, the impact modifier with epoxy functionality can be processed with the PES/PPS to reactively bond with the PES and PPS. Examples of reactive impact modifiers include glycidyl methacrylate sold under the Lotader® AX8840 trade designation by Arkema, Inc. headquartered in King of Prussia, Pa. and ethylene terpolymer sold under the ELVALOY PTW trade designation by E.I. duPont de Nemours and Company headquartered in Wilmington, Del. However, other impact modifiers are within the scope of the present disclosure.

The weight percent of the impact modifier can range from 0 wt % to about 10.0 wt % based upon the total weight of the material. In other embodiments, the weight percent of the impact modifier can range from about 0.5 wt % to about 9.0 wt % based upon the total weight of the material. In other embodiments, the weight percent of the impact modifier can range from about 1.0 wt % to about 8.5 wt %.

In some embodiments, antioxidants and stabilizers can be added to the material to prevent degradation and due to oxidation and exposure to elevated temperatures. Exemplary antioxidants and stabilizers are sold under the IRGANOX® 1010 trade designation and the IRGAFOS® 168 trade designation, both of which are sold by CIBA Inc. headquartered in Basel, Switzerland. However, other antioxidants and stabilizers are within the scope of the present disclosure.

The weight percent of the antioxidants and stabilizers can range from 0.01 wt % to about 1.0 wt % based upon the total weight of the material. In other embodiments, the weight percent of the antioxidants and stabilizers can range from about 0.005 wt % to about 0.2 wt % based upon the total weight of the material. In other embodiments, the weight percent of the antioxidants and stabilizers can range from about 0.005 wt % to about 0.1 wt %.

The material can include non-reactive particulates and/or fibrous materials referred to as filler material. The filler material includes, but is not limited to, glass fiber, carbon fiber, graphite, mica, talc, calcium carbonate and the like, and combinations thereof. Inorganic particles such as ferrite or aluminum powder particles, as well as magnetic or ceramic powders may also be added to provide other unique functional material properties. The addition of non-reactive particulate and/or fibrous materials can enhance the material's creep resistance and lower the sensitivity of the material to temperature changes (reduce the coefficient of thermal expansion), but may also provide functional properties to a built part.

The amount of particulate and/or fibrous material in the material can range from about 0.01 wt % to about 70 wt %. In other embodiments, the weight percent of the impact modifier can range from about 5.0 wt % to about 60 wt % based upon the total weight of the material. In other embodiments, the weight percent of the impact modifier can range from about 10.0 wt % to about 50.0 wt %.

In another embodiment, amorphous PES is loaded with a sufficient amount of filler and/or particulate to obtain a desired Tg and a CTE that is similar to that of aluminum, and preferably within ±10% of the CTE of aluminum (about 26 μm/(m·° C.)). While PES is discussed herein, other polymeric materials can be utilized that have a Tg at or above 190° C. The other polymeric materials include, but are not limited to, polyetherimides and polyphenylsulfones.

The fillers and particulate that can be utilized to decrease the CTE while increasing the $T_g$ of the PES include chopped carbon fiber, chopped glass fiber and glass beads. Further particulate materials that can be loaded into the PES include, but are not limited to, nanoparticles, microfillers, ceramics (Aluminum oxides, boron nitride, silica), metals, including stainless steel, aluminum and ferrite containing metals, and minerals such as talc and mica. Combinations of the fillers and particulates described above can be utilized by itself or in combination with one or more other filler or particulate.

Importantly, the use of fillers and particulate decrease the CTE of PES while maintaining a desired $T_g$ and increasing the resistance to chemicals.

A typical amount of filler and particulate that is utilized is between about 1 vol. % and about 40 vol. % based upon the total weight of the material. In another embodiment, the amount of filler and particulate utilized ranged between about 5 vol. % and about 35 vol. %. In yet another embodiment, the filler and/or particulate ranged from about 10 vol. % and about 20 vol. %.

When utilizing chopped carbon fiber with PES in a filament for use in extrusion based additive manufacturing, a loading of about 12.5 wt % and about 18.5 wt % is preferred. A loading of about 12.5 wt % and about 18.5 wt % in PES provided the necessary flexibility to be wound on a spool while providing the desired CTE. However, at higher loadings the filament became brittle and sufficiently rigid to prevent winding on a typical spool. However, at higher loadings, a larger spool can be utilized or supplied in a pellet or granular form.

In one embodiment the feedstock is maintained in a conditioned environment such that the feedstock does not absorb any significant amount of moisture from ambient conditions.

The present disclosure includes a method of printing a 3D mold tool for composite/epoxy overlay parts and where the printed 3D parts are capable of withstanding high temperature cure-cycle requirements for epoxy curing and cleaning with solvents. The method includes providing a filled polymeric part material having at Tg that is greater than 190° C. and has a CTE that is less than about 30 µm/(m·° C.). In some embodiments the CTE is within a range of between about 23 and 29 µm/(m·° C.).

The polymeric part material is filled with particulate and/or filler that is within 5 vol. % and about 40 vol. %. The material is extruded in a layer-wise manner to produce the 3D part to be utilized as a mold tool where that 3D mold tool has a CTE of less than about 30 µm/(m·° C.) in the direction of the print plane (e.g., an X-Y build plane). For example, a commercial 3D printer available from Stratasys, Inc. of Eden Prairie, Minn. and sold under the tradename Fortus™ may be used to print a part in this manner. Alternatively, the material is extruded along 3D toolpaths using a multi-axis 3D printer to produce a 3D printed part having a CTE of less than about 30 µm/(m·° C.) irrespective of print direction.

The composite/epoxy is overlayed on the mold and is subsequently subjected to curing temperatures. The cured part is removed from the mold and the mold is subjected to solvent cleaning. The overlay, curing and solvent cleaning can be repeated for numerous parts utilizing the same mold.

Typical polymeric materials include PES, polyetherimides and polyphenylsulfones, and combinations thereof. Typical fillers include chopped carbon fiber, chopped glass fibers and glass beads. Chopped carbon fiber provides isotropic properties in the direction of the extrusion of a road of material while glass beads (hollow or solid) provides isotropic properties across the direction of the flow of the road. Both isotropic properties are beneficial when printing a 3D part for a mold.

Property Analysis and Characterization Procedures

Various properties and characteristics of the part and support materials described herein may be evaluated by various testing procedures as described below:

1. Glass Transition Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "DSC 6000" from PerkinElmer, Waltham, Mass. or "DSC 1" from Mettler Toledo, Schwerzenbach, Switzerland, under nitrogen at a heating rate of 10° C./min.

EXAMPLES

The present disclosure is more particularly described in the following examples that are intended as illustrations only, since numerous modifications and variations within the scope of the present disclosure will be apparent to those skilled in the art.

Example 1

Four bars of 100 wt % PES were formed using a steel mold and a heated hydraulic press where the bars were formed using 5000 psi of pressure at a temperature of 550° F. Each of the bars had a length of five (5) inches, a width of 0.5 inches and a thickness of a nominal 0.25 inches. The PES utilized in Example 1 had the VERADEL® 3600 trade designation and was manufactured by Solvay Societe Anonyme having a corporate headquarter located in Bruxelles, Belgium.

Two bars were tested in ambient conditions and are designated Test Run 1 and Test Run 2. Two bars were wrapped with a thin paper tissue that was saturated with acetone such that the bar was exposed to the solvent for up to several minutes and are designated by Test Run 3 and Test Run 4. The results of the test are quantified in Table 1 and FIG. 2.

TABLE 1

| Test Run | Peak Load (lbf) | Peak Stress (lbf/in$^2$) | Strain at Break (in/in) | Modulus (lbf/in$^2$) | Stress at Break (lbf/in$^2$) |
| --- | --- | --- | --- | --- | --- |
| 1 | 23.986 | 16639.7 | N/A | 385168.3 | N/A |
| 2 | 23.055 | 15655.1 | N/A | 344936.2 | N/A |
| 3 | 1.370 | 619.1 | 0.001 | 1282135.5 | 0.502 |
| 4 | 0.969 | 401.4 | 0.001 | 661965.7 | 0.503 |

Figure 2:
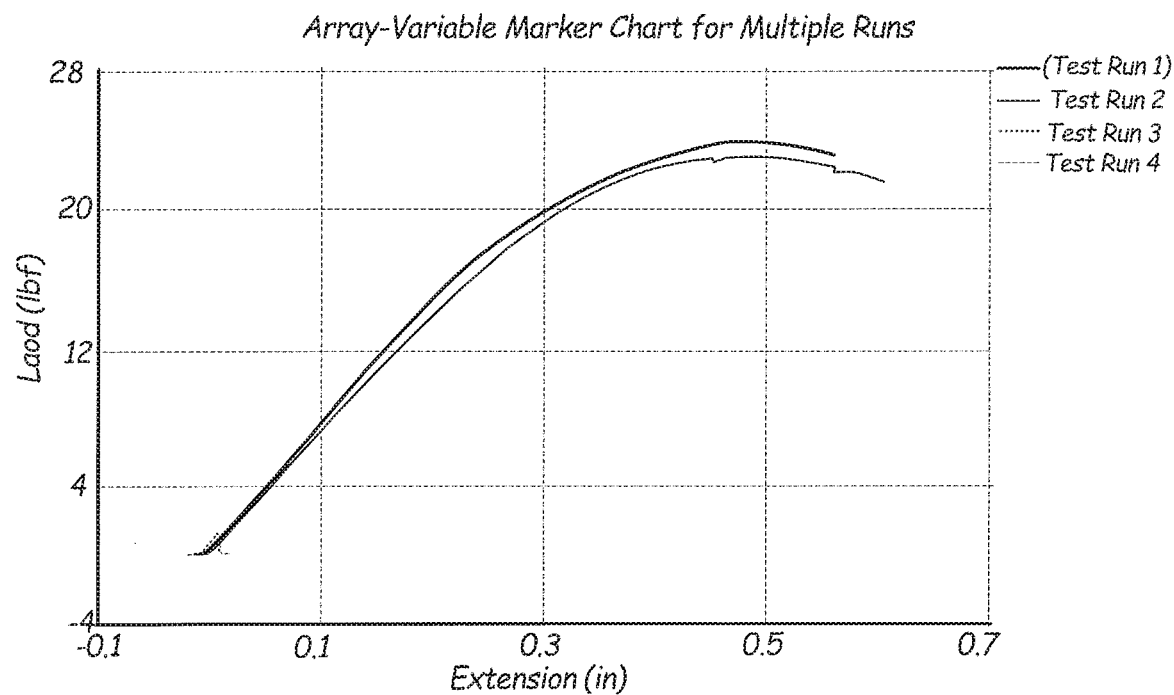
FIG. 2 is a graph of load versus extension for amorphous polyethersulfone (PES) subjected to and not subjected to a solvent.

The results tabulated in Table 1 and illustrated in FIG. 2 illustrate a substantial reduction in strength when PES is exposed to acetone. On average, the peak stress which the PES is able to withstand is reduced from about 16,000 lbf/in$^2$ to about 500 lbf/in$^2$ illustrating the substantial reduction in strength caused by exposure to acetone.

Example 2

Figure 3:
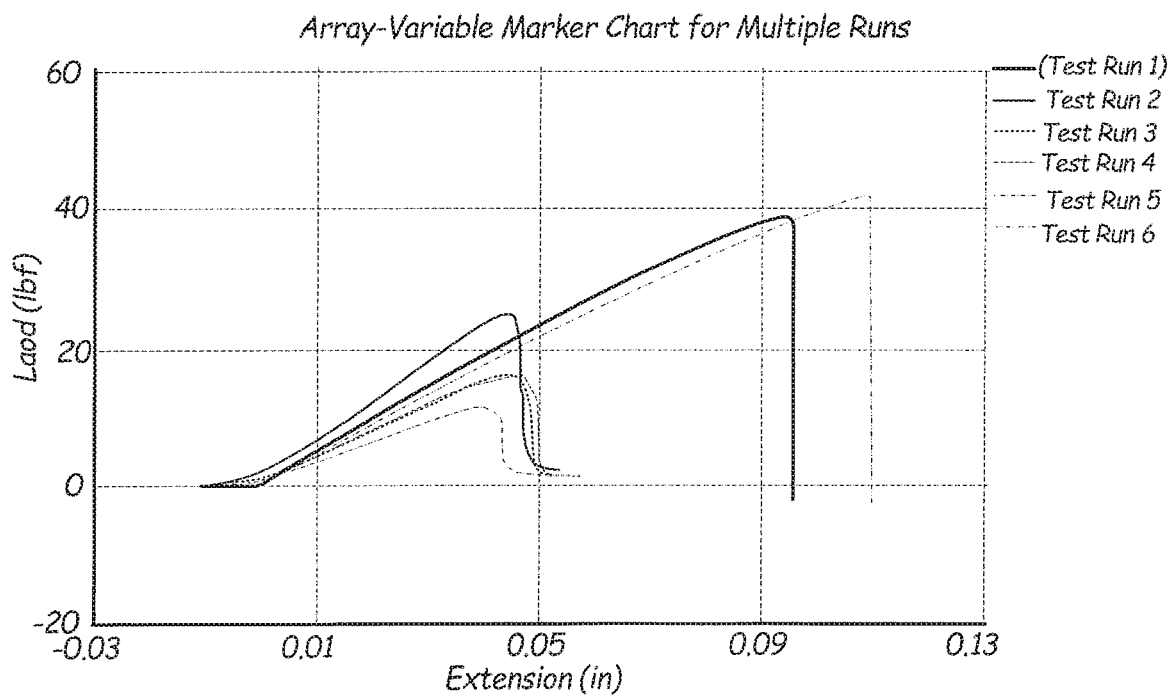
FIG. 3 is a graph of load versus extension for amorphous polyethersulfone (PES) with 15 wt % carbon fiber and 15 wt % graphite powder subjected to and not subjected to a solvent.

Four bars were formed with the same equipment where the PES was loaded with 15 wt % graphite powder and 15 wt % carbon fiber. The bars were five inches long and one inch wide with the press having process conditions of 625° F. and 5000 psi. Two bars were tested without exposure to a solvent indicated at Test Run 1 and 6 and Test Runs 2-5 were wrapped with a thin paper tissue that was saturated with acetone such that the bar was exposed to the solvent for up to several minutes. The results of the test are quantified in Table 2 and FIG. 3

TABLE 2

| Test Run | Peak Load (lbf) | Peak Stress (lbf/in$^2$) | Strain at Break (in/in) | Modulus (lbf/in$^2$) | Stress at Break (lbf/in$^2$) |
|---|---|---|---|---|---|
| 1 | 39 | 21045 | 0.015 | 1728502 | 21045 |
| 2 | 25 | 13456 | 0.007 | 2036809 | 13456 |
| 3 | 16 | 8676 | 0.007 | 1331956 | 8676 |
| 4 | 16 | 8747 | 0.007 | 1345444 | 8747 |
| 5 | 12 | 6225 | 0.006 | 1096210 | 6225 |
| 6 | 42 | 22703 | 0.017 | 1537486 | 22703 |

The results show that the PES inherent strength was tested to be about 22,000 lbf/in$^2$ as evidenced by the data for Test Runs 1 and 6. The strength of the bars were reduced to about 9,300 lbf/in$^2$ when exposed to acetone.

Example 3

Testing was conducted on combinations of PES (VERADEL® 3600) and PPS (FORTRON® 0205B4). Some samples included an impact modifier (ELVALOY® PTW), which is referred to as IM in Table 3. Some samples included a compatibilizer (LOTADER® AX8840) which is referred to as GMA in Table 3. Some samples included antioxidants, referred to as AO in Table 6 and stabilizers referred to as ST in Table 3. Exemplary antioxidants and stabilizers include IRGANOX® 1010 and IRGAFOS® 168. The mixture was melt blended at 320° at 500 RPM using a LabTech twin-screw extruder. The formulations of thirteen samples are found in Table 3 where all amounts are in wt %.

TABLE 3

| Sample | PES | IM | GMA | PPS | AO and ST | ST |
|---|---|---|---|---|---|---|
| 1 | 74.96 | 0.0 | 0.0 | 25.0 | 0.01 | 0.03 |
| 2 | 49.96 | 0.0 | 0.0 | 50.0 | 0.01 | 0.03 |
| 3 | 73.96 | 0.0 | 1.0 | 25.0 | 0.01 | 0.03 |
| 4 | 46.96 | 0.0 | 3.0 | 50.0 | 0.01 | 0.03 |
| 5 | 73.46 | 0.0 | 3.0 | 23.5 | 0.01 | 0.03 |
| 6 | 45.96 | 0.0 | 6.0 | 48.0 | 0.01 | 0.03 |
| 7 | 72.46 | 2.5 | 0.0 | 25.0 | 0.01 | 0.03 |
| 8 | 44.96 | 7.5 | 0.0 | 47.5 | 0.01 | 0.03 |
| 9 | 72.96 | 2.5 | 0.5 | 24.0 | 0.01 | 0.03 |
| 10 | 43.96 | 7.5 | 1.5 | 47.0 | 0.01 | 0.03 |
| 11 | 71.96 | 2.5 | 1.5 | 24.0 | 0.01 | 0.03 |
| 12 | 72.46 | 7.5 | 3.0 | 47.0 | 0.01 | 0.03 |
| 13 | 99.96 | 0.0 | 0.0 | 0.0 | 0.01 | 0.03 |

Each formulation was melt processed to form a polymer matrix. Each formulation as was the formed into bars formed in to ASTM D638 and ASTM D790 test bars using an Engel molding press with a melting temperature of 315° C. Each sample was subjected to flexural strength testing ASTM D790 and flexural modulus testing ASTM D638. The results of the testing are tabulated in Table 4.

TABLE 4

| Sample | Flexural Strength (psi) | St. Dev. | Flexural Modulus (psi) | St. Dev. |
|---|---|---|---|---|
| 1 | 20900 | 274 | 456000 | 8450 |
| 2 | 21100 | 235 | 471000 | 7291 |
| 3 | 30200* | 340 | 440000 | 7740 |
| 4 | 18800 | 68.5 | 427000 | 1630 |
| 5 | 18500 | 100 | 407000 | 2060 |
| 6 | 16100 | 237 | 400000 | 6320 |
| 7 | 18600 | 95.5 | 411000 | 2550 |
| 8 | 16100 | 194 | 373000 | 6380 |
| 9 | 18000 | 311 | 402000 | 9970 |
| 10 | 15500 | 117 | 359000 | 4300 |
| 11 | 19300 | 159 | 424000 | 3800 |
| 12 | 14400 | 890 | 342000 | 9170 |
| 13 | 20300 | 224 | 423000 | 6450 |

*This sample is atypical relative to the other samples. Applicant suspects that the crystallinity of Sample 3 could be different from that of the other samples which resulted in the greater flexural strength.

The results of the testing show that all samples have between 15000 and 20000 psi flexural strength and between 350000 and 450000 psi flexural modulus. Sample with higher weight percents of impact modifiers where less stiff and strong relative to samples that did not contain impact modifiers.

Tensile testing was conducted on the thirteen samples. Tensile strength was determined by ASTM D638 and elongation at break ASTM D790. The results of the tensile testing are tabulated in Table 5.

TABLE 5

| Sample | Tensile Strength (psi) | SD | Elongation at Break (%) | SD | Elongation at Yield (%) | SD | Tensile Modulus (psi) | SD |
|---|---|---|---|---|---|---|---|---|
| 1 | 10800 | 823 | 3.47 | 0.73 | 3.47 | 0.71 | 424000 | 9910 |
| 2 | 10700 | 1720 | 3.25 | 0.91 | 3.26 | 0.91 | 446000 | 15300 |
| 3 | 11900 | 161 | 32.40 | 23.00 | 5.65 | 0.40 | 406000 | 5560 |
| 4 | 11100 | 29.0 | 9.96 | 3.75 | 5.72 | 0.24 | 399000 | 1450 |
| 5 | 11200 | 34.9 | 33.80 | 17.40 | 5.60 | 0.05 | 383000 | 4470 |
| 6 | 10200 | 22.9 | 23.20 | 15.50 | 5.90 | 0.16 | 369000 | 5840 |
| 7 | 10900 | 231 | 26.70 | 18.50 | 5.07 | 0.65 | 380000 | 2670 |
| 8 | 9420 | 47.7 | 16.30 | 3.45 | 5.50 | 0.19 | 354000 | 4870 |
| 9 | 10800 | 42.5 | 18.60 | 19.90 | 5.29 | 0.23 | 371000 | 2050 |
| 10 | 9020 | 86.0 | 19.40 | 6.53 | 5.45 | 0.14 | 334000 | 4300 |
| 11 | 11300 | 431 | 18.50 | 19.00 | 5.22 | 0.78 | 393000 | 6090 |
| 12 | 8650 | 82.0 | 38.70 | 24.40 | 5.33 | 0.24 | 326000 | 2780 |
| 13 | 1220 | 180 | 23.50 | 15.60 | 6.08 | 0.71 | 394000 | 3580 |

The test results indicated that, while there is variability in tensile elongation, that compatabilizers and impact modifiers aids in counteracting the inherently low ductility of the samples, especially as the wt % of PPS increases in the sample. Variability in elongation at break could be a result of molding defects, such as gas bubbles. Each of the samples was molded with between about 0.03 wt % and 0.04 wt % moisture.

Each of the thirteen samples were tested for unnotched impact strength with a 30 pound pendulum pursuant to ASTM D256 (Izod impact test). The results are tabulated in Table 6.

TABLE 6

| Sample | Average Force to Complete Break (psi) | SD | Average Force to Hinged Break (psi) | SD |
| --- | --- | --- | --- | --- |
| 1 | 14.17 | 11.96 | N/A | N/A |
| 2 | 19.25 | 8.01 | N/A | N/A |
| 3 | N/A | N/A | N/A | N/A |
| 4 | 30.53 | 1.67 | N/A | N/A |
| 5 | 15.43 | N/A | 57.06 | N/A |
| 6 | N/A | N/A | N/A | N/A |
| 7 | N/A | N/A | N/A | N/A |
| 8 | 22.86 | N/A | N/A | N/A |
| 9 | 29.84 | 2.87 | N/A | N/A |
| 10 | N/A | N/A | 43.85 | 0.86 |
| 11 | N/A | N/A | N/A | N/A |
| 12 | N/A | N/A | N/A | N/A |
| 13 | N/A | N/A | N/A | N/A |

The results of the un-notched impact test indicated the addition of impact modifiers, especially to samples with lower PPS contact lead to materials that did not break when struck with the 30 pound pendulum. PES by itself did not break when struck with the pendulum.

The thirteen samples were then tested using the Notched Izod Impact test as provided in ASTM D256. The results are tabulated in Table 7.

TABLE 7

| Sample | Average Force to Complete Break (psi) | SD | Average Force to Hinged Break (psi) | SD |
| --- | --- | --- | --- | --- |
| 1 | 0.79 | 0.29 | N/A | N/A |
| 2 | 0.37 | 0.13 | N/A | N/A |
| 3 | 1.54 | 0.10 | N/A | N/A |
| 4 | 1.01 | 0.07 | N/A | N/A |
| 5 | 1.63 | 0.13 | N/A | N/A |
| 6 | 1.21 | 0.12 | N/A | N/A |
| 7 | 1.21 | 0.12 | N/A | N/A |
| 8 | 1.33 | 0.16 | N/A | N/A |
| 9 | 1.29 | 0.06 | N/A | N/A |
| 10 | 1.53 | 0.11 | N/A | N/A |
| 11 | 1.47 | 0.09 | N/A | N/A |
| 12 | 1.81 | 0.16 | N/A | N/A |
| 13 | 1.07 | 0.49 | N/A | N/A |

The test results of the Notched Izod Impact test indicate that PES/PPS blends have lower notched impact toughness relative to materials that include impact modifier in any amount and/or combination. In some instances, impact performance is improved over the base PES material.

The resistance to cracking was tested regarding Samples 13, 1, 2, 5 and 6 of Example 3 to determine the resistance to cracking with and without solvent exposure. Each of the test bars was annealed for 20 minutes at 150° C. to ensure full crystallinity of the PPS phase for best physical properties. At least one test bar for each of the samples was tested without exposure to a solvent while the remaining samples were tested while exposed to the solvent.

The solvent exposure was caused by wrapping one half of a KIMWIPES® tissue manufactured by Kimberly-Clark Worldwide, Inc. headquartered in Neenah, Wis. The tissue was soaked with acetone dispensed from a pipette just prior to testing and again if the test took more than about 90 second to about 120 seconds to reaching a breaking point to compensate for evaporation of acetone.

The stress cracking test was performed pursuant to ASTM D790 flexure test where the test was customized to expose the test bars to a solvent by wrapping the test bar with the KIMWIPES® tissue saturated with the solvent. The results of the stress crack test for Sample 13 (over 99 wt % amorphous PES). The results of the stress cracking test for Sample 13 are tabulated in Table 8 and FIG. 4.

TABLE 8

| No. | Peak Load (lbf) | Peak Stress (lbf/in$^2$) | Strain at Peak (in/in) | Modulus (lbf/in$^2$) | Stress at Break (lbf/in$^2$) |
| --- | --- | --- | --- | --- | --- |
| 1 | 48.934 | 19018.7 | N/A | 422503 | N/A |
| 2 | 3.993 | 1539.7 | 0.005 | 356939 | 15390698 |
| 3 | 3.464 | 1347.8 | 0.004 | 337708 | 1347.798 |
| 4 | 4.334 | 1684.5 | 0.006 | 345089 | 1684.486 |
| 5 | 4.415 | 1716.0 | 0.006 | 307621 | 1715.972 |
| Mean | 13.028 | 5061.3 | N/A | 353972 | N/A |
| St. Dev. | 20.075 | 7803.8 | N/A | 42418 | N/A |

Figure 4:
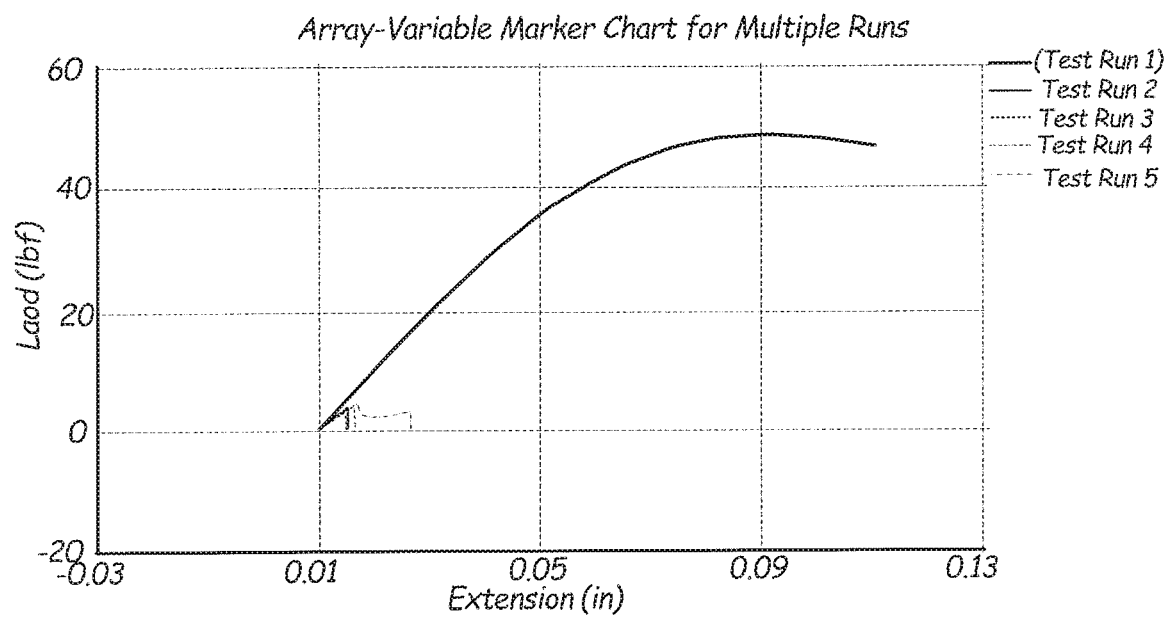
FIG. 4 is a graph of load versus extension for PES with antioxidants and stabilizers subjected to and not subjected to a solvent.

Sample 1 of Table 8 was not exposed acetone and exhibited significantly more strength than those samples of the same material that were exposed to acetone. Referring to samples 2-5 about 1600 psi of flexural load resulted in catastrophic failure where the loading is less than 0.5% strain. Table 8 and FIG. 4 illustrate the negative effects that solvents have on amorphous material, such as PES.

Figure 5:
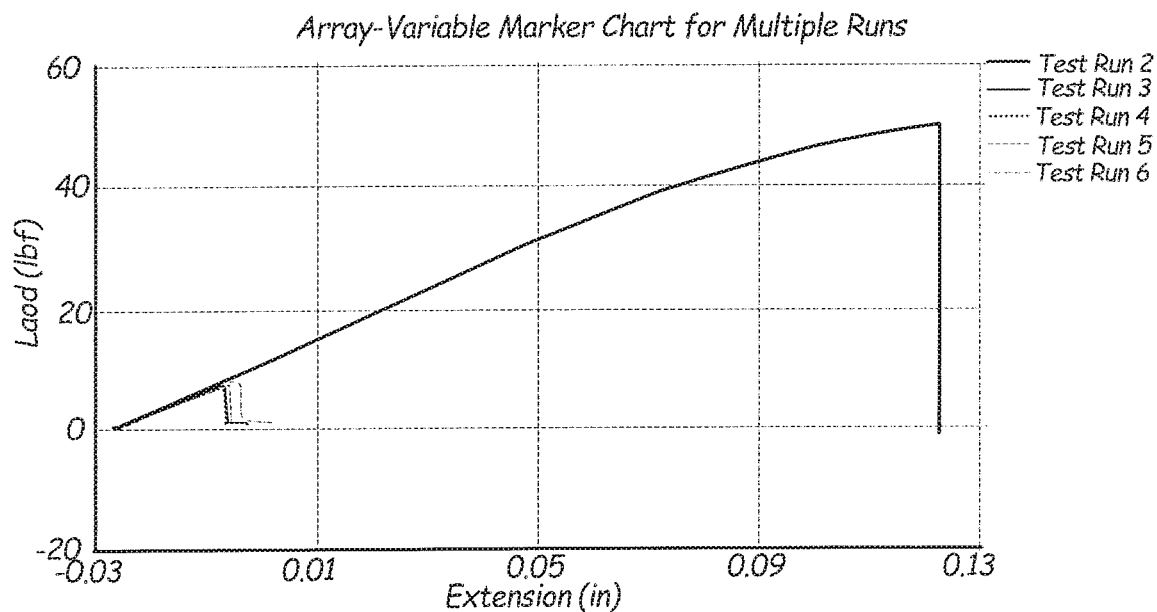
FIG. 5 is a graph of load versus extension for a material having a polymer matrix of 75 wt % PES and 25 wt. % PPS subjected to and not subject to a solvent.

The material having the composition of Sample 1 of Table 3 having a polymer alloy of PES/PPS with 25 wt % PPS and about 75 wt % PES was also stress tested as disclosed above with and with exposure to acetone. The results of the stress test for the material of Sample 1 are tabulated in Table 9 and illustrated in FIG. 5.

TABLE 9

| No. | Peak Stress (lbf/in$^2$) | Strain at Peak (in/in) | Modulus (lbf/in$^2$) | Stress at Break (lbf/in$^2$) |
| --- | --- | --- | --- | --- |
| 1 | 19785.4 | 0.056 | 438302 | 19785.000 |
| 2 | 2852.3 | 0.007 | 423576 | 2852.342 |
| 3 | 2646.7 | 0.007 | 397329 | 2646.738 |
| 4 | 2905.0 | 0.007 | 405251 | 2905.029 |
| 5 | 3098.7 | 0.008 | 407353 | 3098.733 |
| Mean | 6257.7 | 0.017 | 414362 | 6257.658 |
| St. Dev. | 7564.0 | 0.022 | 16434 | 7563.976 |

Compared to the data respect to Sample 13, which only includes amorphous PES with additive, a matrix that includes crystalline PPS at 25 wt % nearly doubles the stress at break strength and the strain at break values. All failures were believed to be the result of the brittleness of the PPS.

Figure 6:
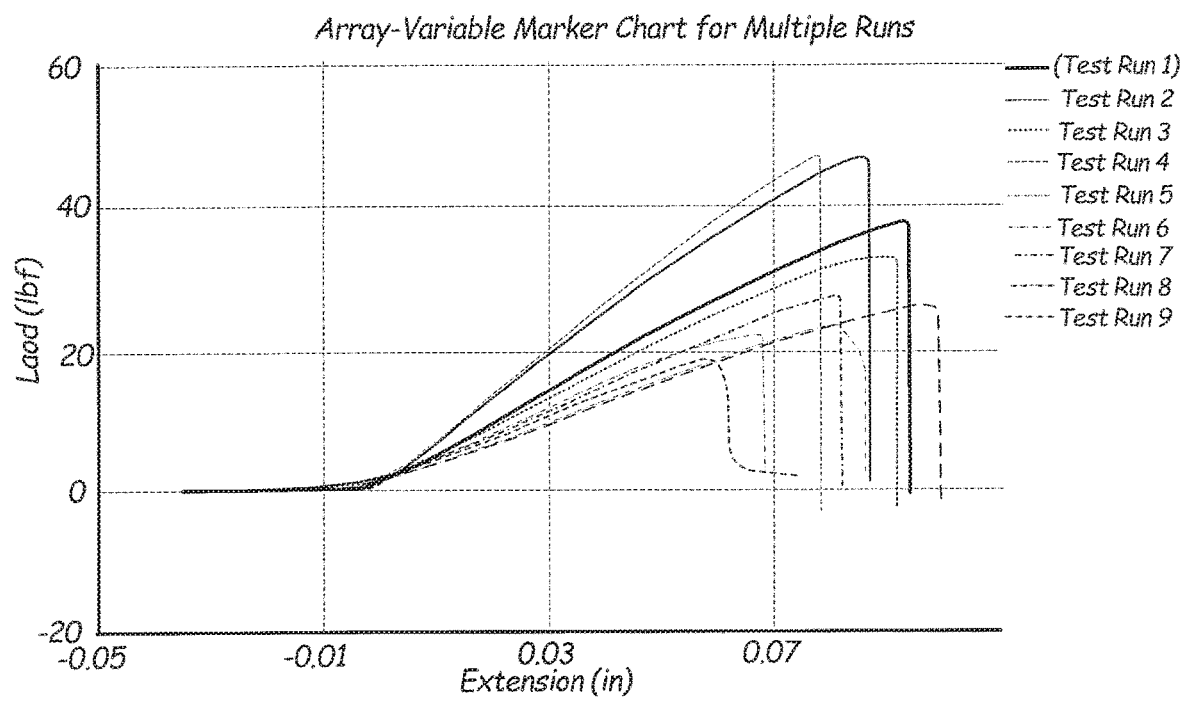
FIG. 6 is a graph of load versus extension for a material having a polymer matrix of 50 wt % PES and 50 wt. % PPS subjected to and not subject to a solvent.

The material having the composition of Sample 2 of Table 3 having a polymer alloy of PES/PPS with 50 wt % PPS and about 50 wt % PES was also stress tested as disclosed above with and with exposure to acetone. The results of the stress test for the material of Sample 2 are tabulated in Table 10 and illustrated in FIG. 6.

TABLE 10

| No. | Peak Load (lbf) | Peak Stress (lbf/in$^2$) | Strain at Peak (in/in) | Modulus (lbf/in$^2$) | Stress at Break (lbf/in$^2$) |
| --- | --- | --- | --- | --- | --- |
| 1 | 32.142 | 12543.3 | 0.027 | 460314 | 12543 |
| 2 | 27.501 | 10732.0 | 0.034 | 440630 | 10732 |
| 3 | 29.179 | 11571.5 | 0.033 | 449565 | 11571 |
| 4 | 27.199 | 10808.3 | 0.035 | 456316 | 10808 |
| 5 | 28.929 | 11380.4 | 0.036 | 457268 | 11380 |
| 6 | 28.99 | 11407.1 | 0.033 | 452819 | 11407 |

The blend of 50 wt % PPS with about 50% PES exhibit increased resistance to solvent exposure. There was little difference between the strain at break and stress at break of the material whether the material was exposed to acetone or not. While some softening occurred due to chemical exposure at higher stress and strain, the material maintained strength similar to that of the material that was not exposed to solvent. All failures were due to the brittleness of the material.

Figure 7:
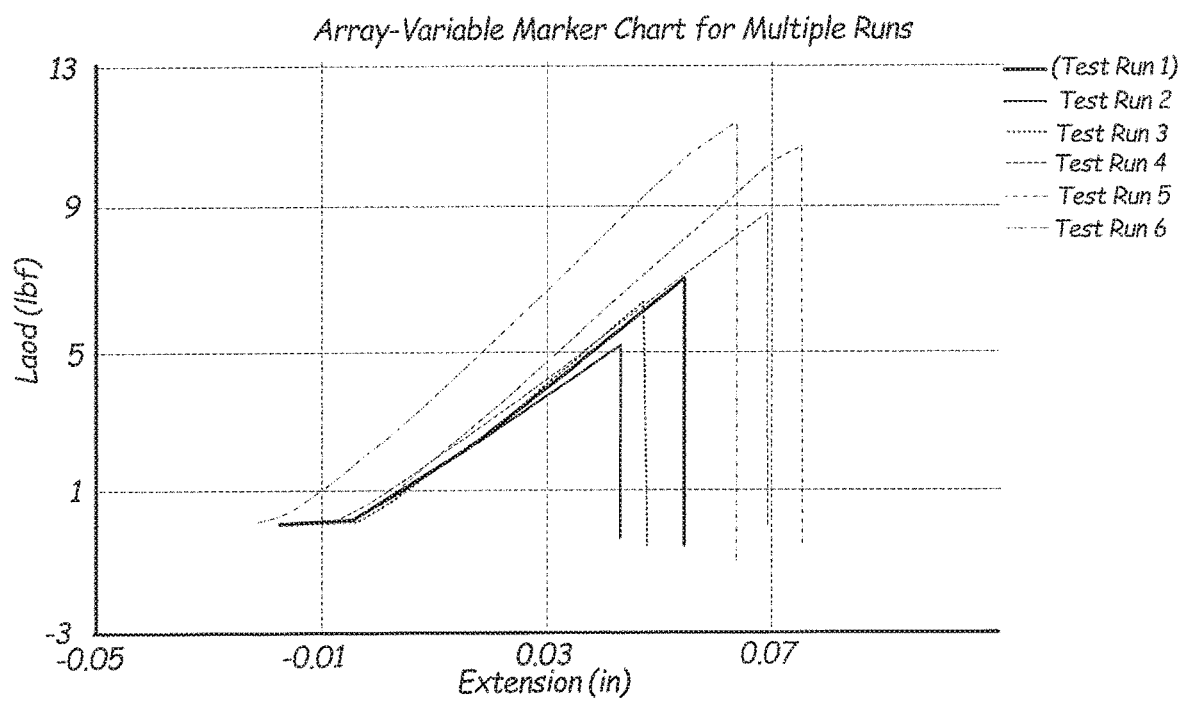
FIG. 7 is a graph of load versus extension for a material having a polymer matrix of 73.46 wt % PES, 23.5 wt. % PPS and 3 wt % impact modifier subjected to and not subject to a solvent.

The material having the composition of Sample 5 of Table 3 having a polymer alloy of PES/PPS with 23.5 wt % PPS and 73.46 wt % PES along with 3 wt % impact modifier to determine the effects of the impact modifier on the physical properties of the material. The material was also stress tested as disclosed above with and with exposure to acetone. The results of the stress test for the material of Sample 5 are tabulated in Table 11 and illustrated in FIG. 7.

TABLE 11

| No. | Peak Load (lbf) | Peak Stress (lbf/in$^2$) | Strain at Peak (in/in) | Modulus (lbf/in$^2$) | Stress at Break (lbf/in$^2$) |
| --- | --- | --- | --- | --- | --- |
| 1 | 49.427 | 19288.8 | N/A | 407800 | N/A |
| 2 | 5.817 | 2269.9 | 0.006 | 370551 | 2269.899 |
| 3 | 8.119 | 3168.3 | 0.008 | 384887 | 3168.313 |
| 4 | 5.830 | 2275.0 | 0.006 | 362180 | 2275.034 |
| 5 | 6.446 | 2515.7 | 0.007 | 363681 | 2515.687 |
| Mean | 15.128 | 5903.5 | N/A | 377820 | N/A |
| St. Dev. | 19.197 | 7491.5 | N/A | 19014 | N/A |

The inclusion of 3 wt % impact modifier along with about 25 wt % PPS and about 75 wt % PES in the material exhibit strength characteristic similar to that of Sample 1, as tabulated in Table 11. However, the un-exposed sample of the material in Sample 5 now exhibits ductile failure (no break) that is not present in Sample 1.

Figure 8:
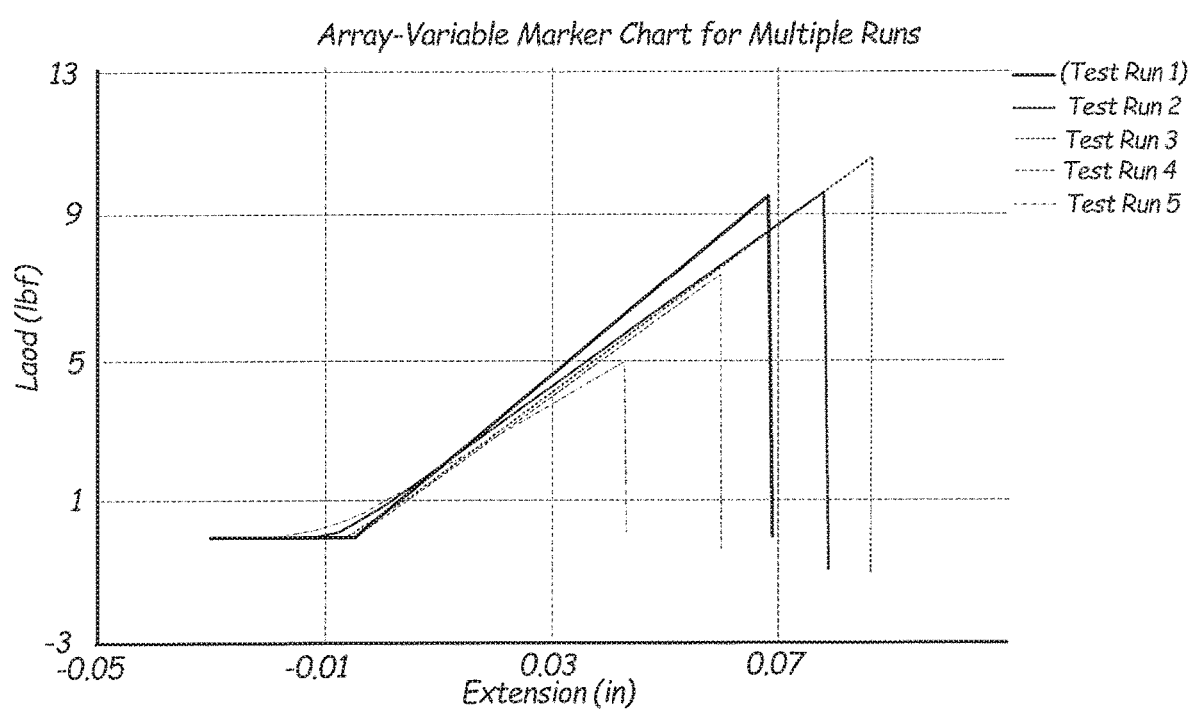
FIG. 8 is a graph of load versus extension for a material having a polymer matrix of 45.96 wt % PES, 48.0 wt. % PPS and 6 wt % impact modifier subjected to and not subject to a solvent.

The material having the composition of Sample 6 of Table 3 having a polymer alloy of PES/PPS with 48.0 wt % PPS and 45.96 wt % PES along with 6 wt % impact modifier to determine the effects of the impact modifier on the physical properties of the material. The material was also stress tested as disclosed above with and with exposure to acetone. The results of the stress test for the material of Sample 6 are tabulated in Table 12 and illustrated in FIG. 8.

TABLE 12

| No. | Peak Load (lbf) | Peak Stress (lbf/in$^2$) | Strain at Peak (in/in) | Modulus (lbf/in$^2$) | Stress at Break (lbf/in$^2$) |
| --- | --- | --- | --- | --- | --- |
| 1 | 43.585 | 17602.1 | N/A | 397623 | N/A |
| 2 | 28.593 | 11571.0 | 0.042 | 402815 | 11571 |
| 3 | 28.686 | 11398.9 | 0.040 | 386605 | 11399 |
| 4 | 26.744 | 10627.3 | 0.036 | 376863 | 10627 |

TABLE 12-continued

| No. | Peak Load (lbf) | Peak Stress (lbf/in$^2$) | Strain at Peak (in/in) | Modulus (lbf/in$^2$) | Stress at Break (lbf/in$^2$) |
| --- | --- | --- | --- | --- | --- |
| 5 | 27.521 | 10958.2 | 0.039 | 375805 | 10958 |
| 6 | 31.026 | 12431.5 | N/A | 387942 | N/A |

The inclusion of 6 wt % impact modifier along with about 25 wt % PPS and about 75 wt % PES in the material exhibit strength characteristic similar to that of Sample 2, as tabulated in Table 10. However, the un-exposed sample of the material in Sample 6 now exhibits ductile failure (no break) that is not present in Sample 2.

Example 4

DSC scans for neat PPS, PES and a blend of PES and PPS were conducted to determine the thermodynamic properties of the PES/PPS blend relative to the neat PPS and PES. The DSC scans were performed utilizing procedures and equipment as provided in the PROPERTY ANALYSIS AND CHARACTERIZATION PROCEDURES portion of the present application.

Figure 9:
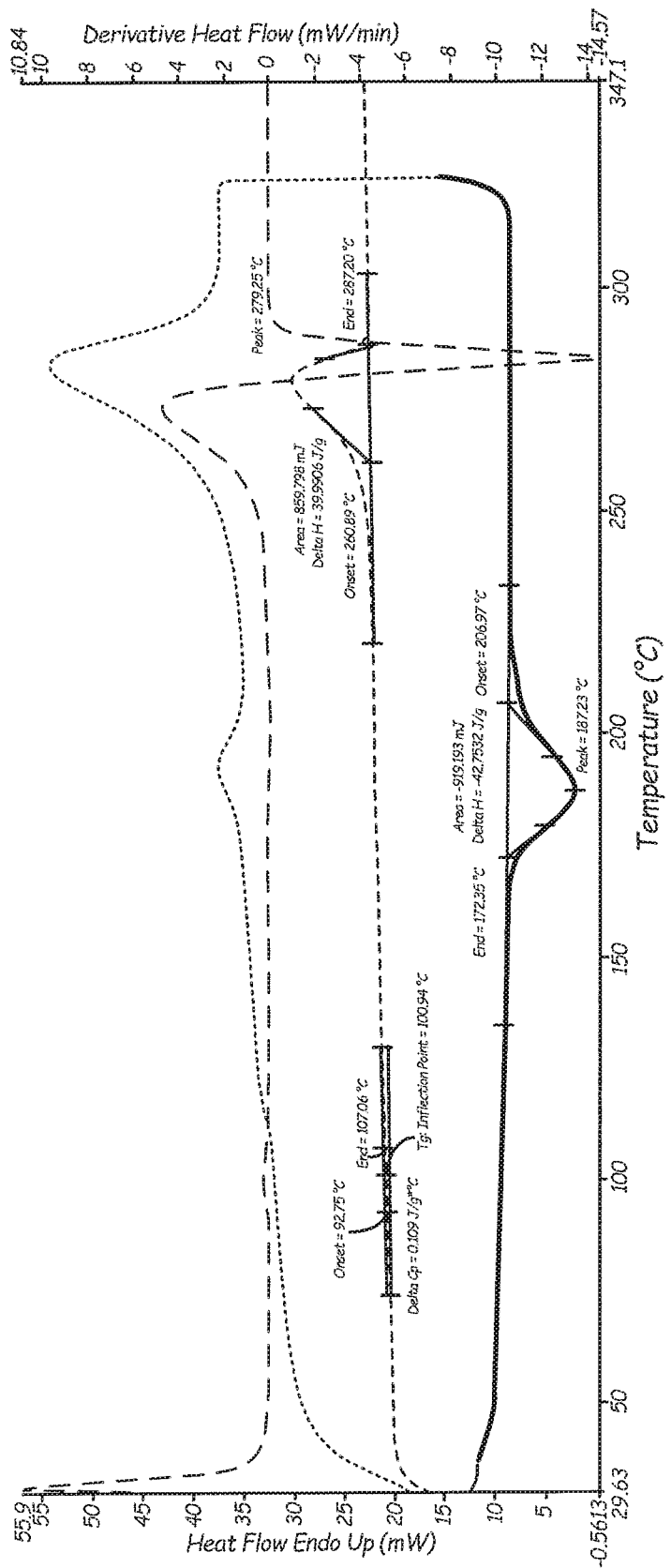
FIG. 9 is a differential scanning calorimetry (DSC) graph of neat PPS.

FIG. 9 is a DSC graph of neat PPS sold under the FORTRON® 0320P0 trade name by Celanese. The DSC shows a $T_g$ at 100.9° C., a melting point at 279.25° C. and a recrystallization temperature at 187.2° C. with a −43 J/g heat of fusion.

Figure 10:
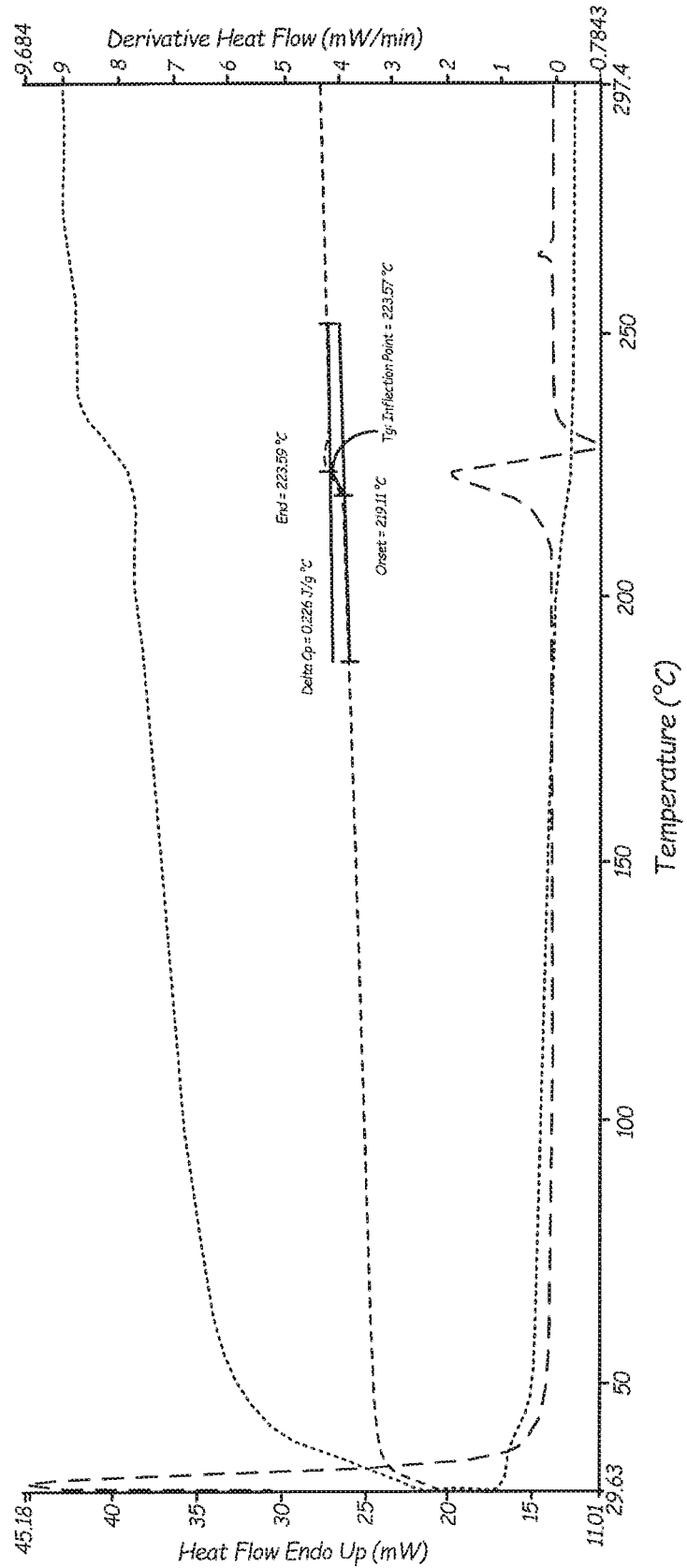
FIG. 10 is a DSC graph of neat PES.

FIG. 10 is a DSC of neat PES sold under the VERADEL® 3600 trade name by Solvay. As PES is an amorphous polymer, the DSC shows a $T_g$ at 223.6° C. and does not have a melting point or recrystallization temperature.

Figure 11:
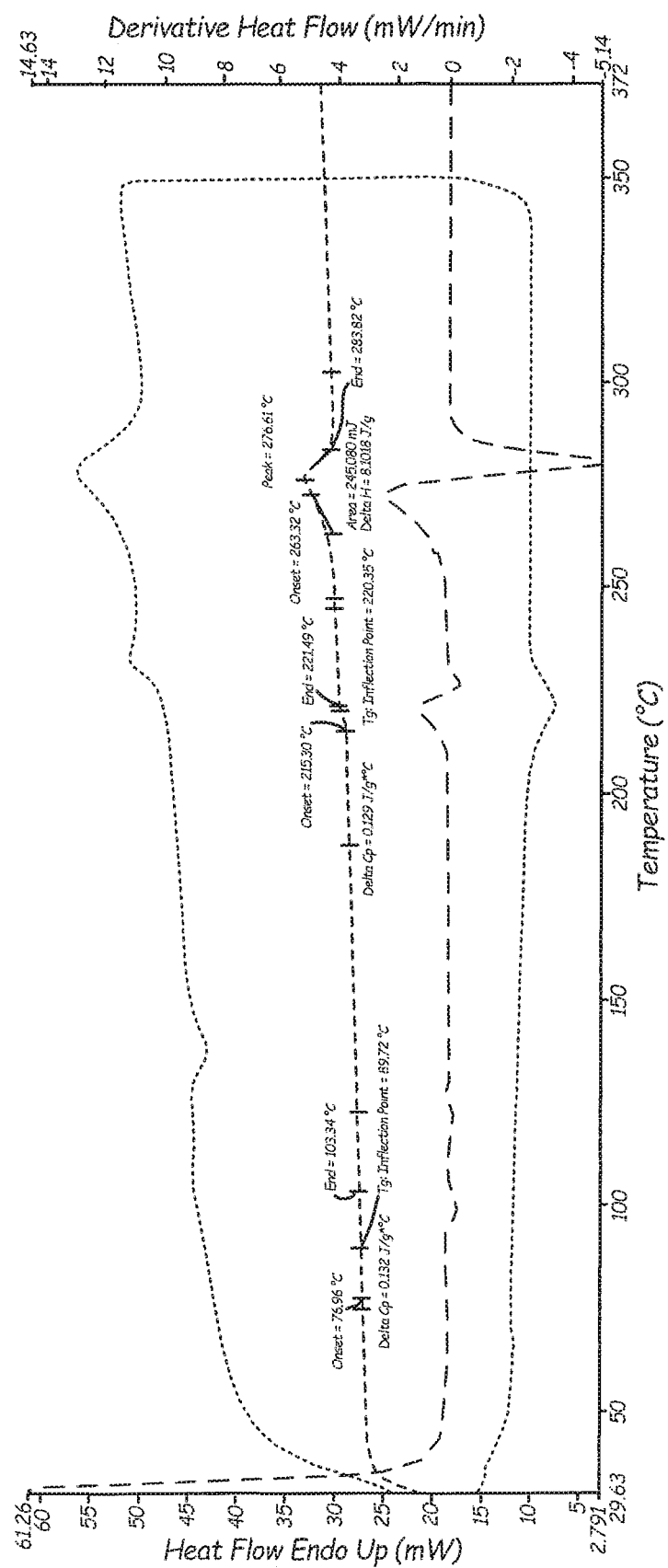
FIG. 11 is a DSC graph of a PES/PPS blend containing impact modifiers, carbon fiber and stabilizers.

FIG. 11 is a DSC graph of a blend of PPS and PES that includes an impact modifier, stabilizers and carbon fiber. The blend includes 55.0 wt. % PES sold under the VERADEL® 3600 trade name by Solvay, 25.47 wt. % PPS sold under the FORTRON® 0320P0 trade name by Celanese, 3.0 wt. % impact modifier sold under the LOTADER® AX8840 designation by Arkema, 0.03 wt. % stabilizers and 17.5 wt. % carbon fiber sold under the PX35 trade name by Zoltek Corporation headquartered in Bridgeton, Mo.

The DSC scan shows a first $T_g$ at 89.7° C. due to the PPS and a second $T_g$ at 221.5° C. due to the PES. The DSC scan indicates that the two $T_g$ of the blend does not significantly vary from the $T_g$ of neat PPS and PES, which indicates that the PES and the PPS are not miscible with each other.

Figure 12:
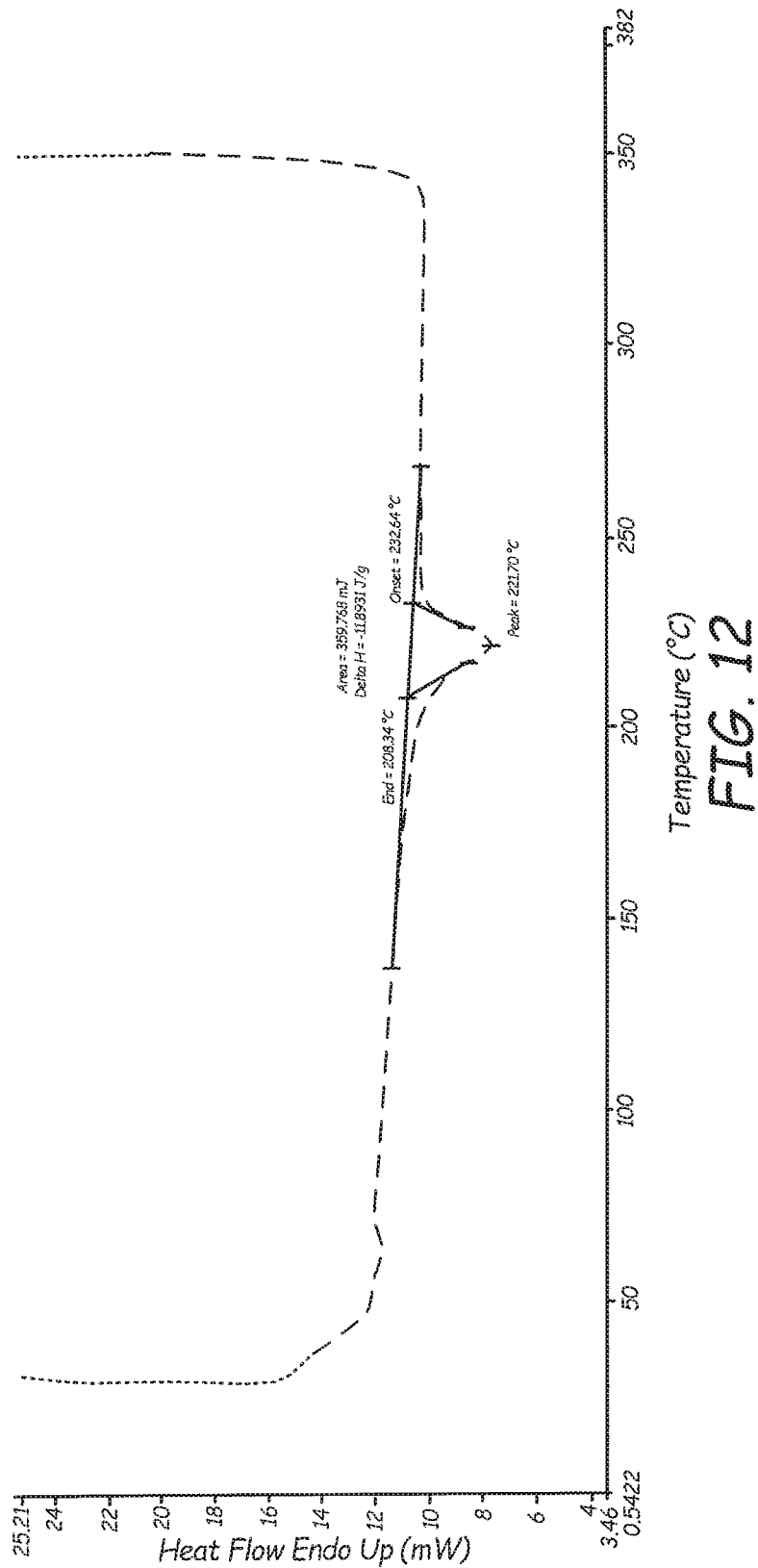
FIG. 12 is a DSC graph of the recrystallization of the blend of FIG. 11 and neat PPS.

The melting point of the blend is 279.25° C., which is consistent with the melting point of the neat PPS. However, the recrystallization temperature is at 221.7° C., which is higher than that of the neat PPS. FIG. 12 is an overlay graph of the heat of fusion of the blend in FIG. 11 and the neat PPS in FIG. 9.

FIG. 12 illustrates that the blend has a higher recrystallization temperature than that of the neat PPS and a heat of fusion of −12 J/G, which is roughly one fourth of the heat of fusion of neat PPS. FIG. 12 illustrates that recrystallization of PPS in the blend is slightly accelerated relative to the neat PPS and achieves full recrystallization. The blend exhibits no significant reduction or retardation of the crystallization kinetics relative to the neat PPS.

Example 5

Figure 13:
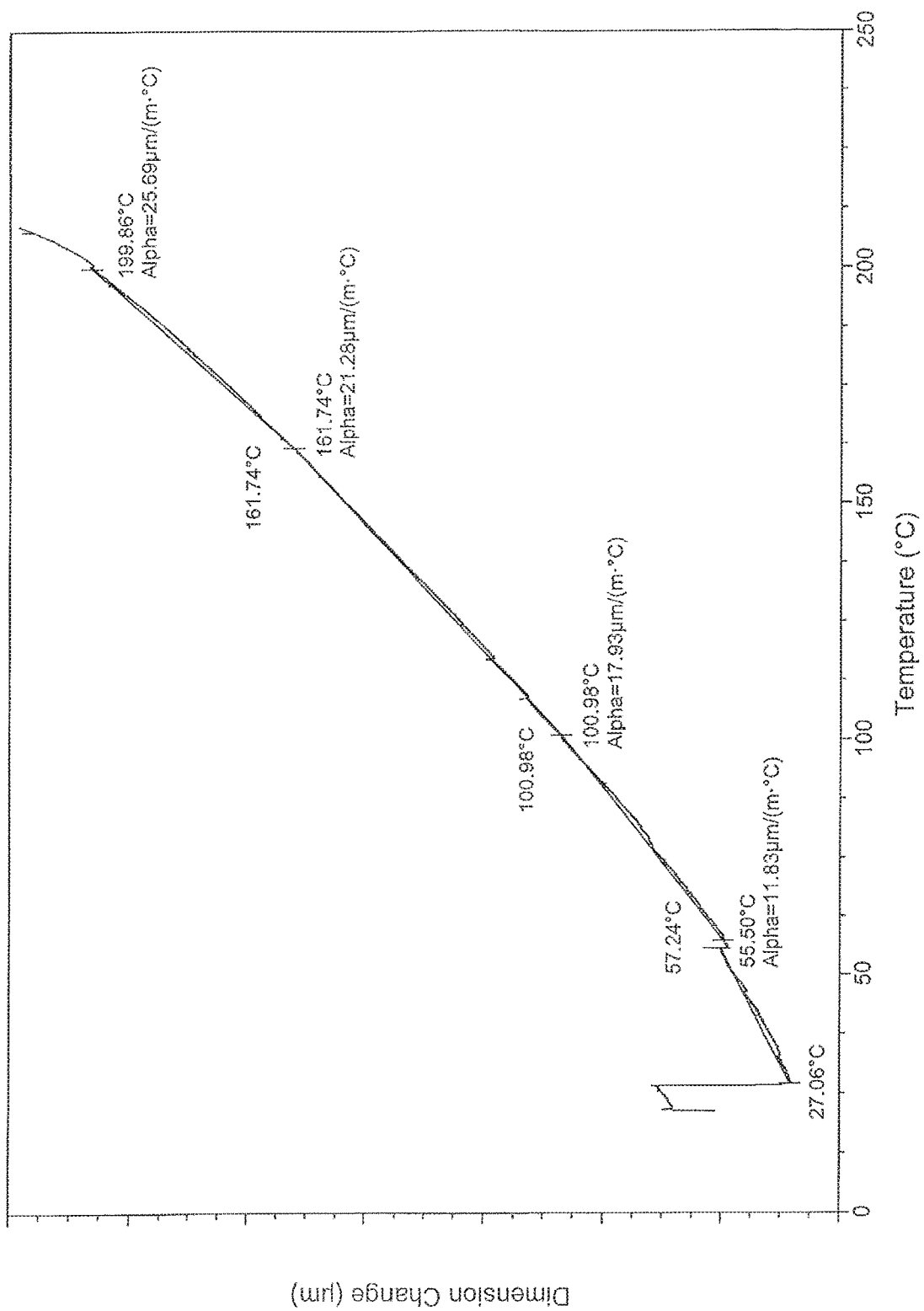
FIG. 13 is a graph of change of dimension versus change in temperature for a PES matrix loaded with 15 wt % carbon fiber.
Figure 14:
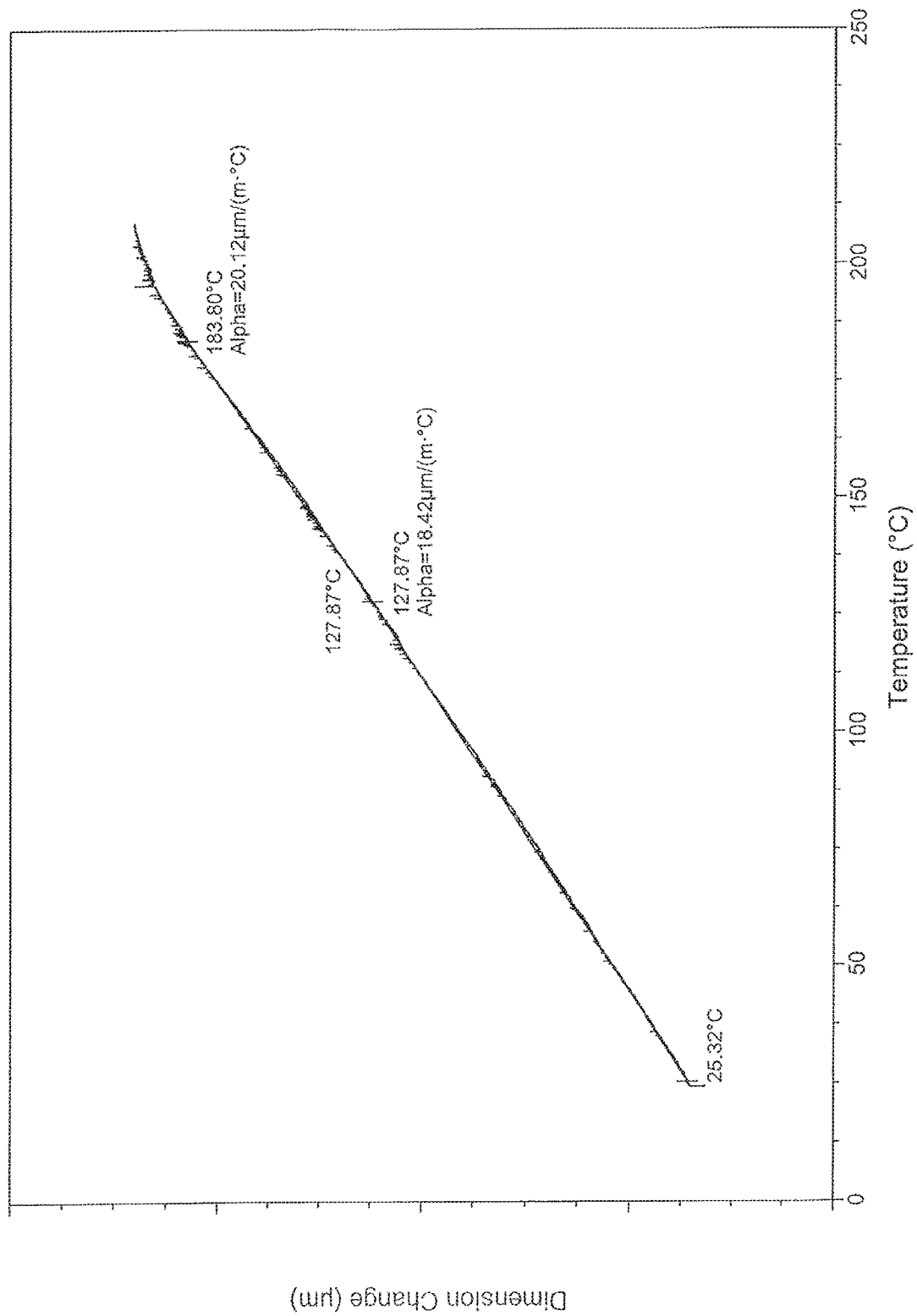
FIG. 14 is a graph of change of dimension versus change in temperature for a PES matrix loaded with 20 wt % carbon fiber.

A thermomechanical analysis was conducted to determine the amount of thermal expansion of PES matrices loaded with 15 wt % and 20 wt %. The amount of expansion was measured utilizing a thermomechanical analyzer Model No. Q400 TMA manufactured by TA Instruments, Inc. located in Eden Prairie, Minn. A quart probe in the thermomechanical analyzer was utilized and each sample was heated from ambient temperature of about 25° C. to a temperature greater than 200° C. at a rate of 5° C. per minute. The rate of thermal expansion for the PES matrix loaded with 15 wt % carbon fiber is illustrated in FIG. 13 and the rate of thermal expansion for the PES matrix loaded with 20 wt % is illustrated in FIG. 14.

The CTE is measured by calculating the slope along the graph wherein CTE calculations are illustrated along the graph. The CTE of the PES loaded with 15 wt % carbon fiber is comparable to that of Aluminum (about 26 μm/(m·° C.)) at temperatures nearing 200° C. The CTE of the PES loaded with 20 wt % carbon fiber is less than that of Aluminum (about 26 μm/(m·° C.)) at temperatures nearing 200° C.

This example illustrates that loading a polymeric matrix, such as PES, with a relatively low amount of filler, such as carbon fiber, provides a material having a CTE that is comparable with or less than that of Aluminum.

Although the present disclosure has been described with reference to preferred embodiments, workers skilled in the art will recognize that changes may be made in form and detail without departing from the spirit and scope of the disclosure.

The invention claimed is:

1. A consumable material configured for use in an additive manufacturing system, the material comprising:
   a substantially uniform polymeric matrix comprising polyetherersulfone (PES) comprising in a range between about 30 wt % and about 85 wt % of the polymeric matrix and polyphenylene sulfide (PPS) in a range between about 15 wt % and about 70 wt % of the polymeric matrix and non-reactive filler materials in the range of about 0.01 wt % and about 70 wt % and an impact modifier configured to increase ductility of the polymer matrix, wherein the impact modifier comprises one or more compounds that react with PES and/or PPS wherein the one or more compounds comprises glycidyl methacrylate or ethylene terpolymer, wherein the polymeric matrix is in a media form suitable processing in the additive manufacturing system and having a glass transition temperature (Tg) that is about 190° C. or greater and a coefficient of thermal expansion is less than about 23 μm/(m·° C.) to about 29 μm/(m·° C.).

2. The material of claim 1, wherein the impact modifier comprises between about 0.01 wt % and about 10 wt % based upon the total weight of the material.

3. The material of claim 1 and further comprising antioxidants and stabilizers.

4. The material of claim 3, wherein the antioxidants and stabilizers comprises between about 0.001 wt % and about 1.0 wt % based upon the total weight of the material.

5. The material of claim 1, wherein the non-reactive filler materials comprise glass fiber, carbon fiber, graphite, mica, talc, calcium carbonate, metal particulates, ceramic particulates and combinations thereof.

6. The material of claim 1, wherein the non-reactive filler materials comprise between about 10.0 wt % to about 50 wt % based upon the weight of the material.

7. The material of claim 1, wherein the media form comprises filament, pellets or powders.

8. A method for forming a three-dimensional part with an additive manufacturing system, the method comprising:
   providing a substantially uniform polymeric matrix comprising polyetherersulfone (PES) comprising in a range between about 30 wt % and about 85 wt % of the polymeric matrix and polyphenylene sulfide (PPS) in a range between about 15 wt % and about 70 wt % of the polymeric matrix and non-reactive filler materials in the range of about 0.01 wt % and about 70 wt % and an impact modifier configured to increase ductility of the polymer matrix, wherein the impact modifier comprises one or more compounds that react with PES and/or PPS wherein the one or more compounds comprises glycidyl methacrylate or ethylene terpolymer, wherein the polymeric matrix is in a media form suitable processing in the additive manufacturing system and having a glass transition temperature (Tg) that is about 190° C. or greater and a coefficient of thermal expansion is less than about 23 μm/(m·° C.) to about 29 μm/(m·° C.); and
   printing a composite mold tool from the feedstock in an additive manufacturing system.

9. The method of claim 8, wherein the coefficient of thermal expansion ranges from about 23 μm/(m·° C.) to about 29 μm/(m·° C.).

10. The method of claim 8, wherein the fillers comprise between 5 vol. % and about 35 vol. %.

11. The method of claim 8, wherein the fillers from about 10 vol. % and about 20 vol. %.

12. The method of claim 8, wherein the fillers comprise chopped carbon fiber, chopped glass fiber, glass beads, graphite, mica, talc, calcium carbonate, metal particulate and combinations thereof.

13. The method of claim 8, wherein the filler comprises chopped carbon fiber.

14. The method of claim 8, wherein the fillers comprise nanoparticles, microfillers and ceramics and combinations thereof.

15. The method of claim 8, wherein the step of processing the material comprises:
   advancing the material to a print head;
   heating the material in the print head to a molten state; and
   extruding the material from a nozzle in the print head along toolpaths in a build pattern.

16. The method of claim 15, wherein the build pattern is comprised of two-dimensional planar layers stacked along a build axis, and wherein the planar layers of the mold tool have a coefficient of thermal expansion that is less than about 30 μm/(m·° C.).

17. The method of claim 15, wherein the build pattern is formed of 3D toolpaths, and wherein the mold tool has a coefficient of thermal expansion that is less than about 30 μm/(m·° C.).

18. The method of claim 8 and further comprising:
   utilizing the printed composite mold tool as a mold or a mold insert;
   placing a solid material comprising carbon fiber and an uncured resin in the mold tool;
   subjecting the mold tool, the material and the uncured resin to process conditions sufficient to cure the resin to form a composite part on the mold tool;
   removing the composite part from the mold tool;
   cleaning residue from the mold tool with a solvent; and
   repeating the process of forming the composite part and removing residue with the solvent wherein the material of the mold tool withstands the process conditions and repeated exposure to solvent utilized in the layup manufacturing technique.

* * * * *